US008606281B2

(12) United States Patent
Kaukoranta et al.

(10) Patent No.: US 8,606,281 B2
(45) Date of Patent: Dec. 10, 2013

(54) SYSTEM AND METHOD FOR REQUESTING UPLINK RESOURCES IN A COMMUNICATION SYSTEM

(75) Inventors: Mika Petteri Kaukoranta, Oulu (FI); Lars Dalsgaard, Oulu (FI); Jarkko Tuomo Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 333 days.

(21) Appl. No.: 12/597,621

(22) PCT Filed: Apr. 25, 2008

(86) PCT No.: PCT/IB2008/051617
§ 371 (c)(1),
(2), (4) Date: May 13, 2010

(87) PCT Pub. No.: WO2008/132685
PCT Pub. Date: Nov. 6, 2008

(65) Prior Publication Data
US 2010/0255850 A1      Oct. 7, 2010

Related U.S. Application Data

(60) Provisional application No. 60/926,686, filed on Apr. 26, 2007.

(51) Int. Cl.
*H04W 72/00* (2009.01)
(52) U.S. Cl.
USPC .......................................... 455/450; 455/509
(58) Field of Classification Search
USPC .................................................. 455/450, 509
See application file for complete search history.

(56) References Cited

U.S. PATENT DOCUMENTS

| | | | | |
|---|---|---|---|---|
| 6,567,396 B1 * | 5/2003 | Pohjanvouri et al. | ......... | 370/349 |
| 7,869,404 B2 * | 1/2011 | Kanterakis | ................... | 370/329 |
| 8,265,640 B2 * | 9/2012 | Meylan et al. | ................ | 455/450 |
| 2002/0009067 A1 * | 1/2002 | Sachs et al. | .................... | 370/338 |
| 2004/0146019 A1 * | 7/2004 | Kim et al. | ..................... | 370/329 |

(Continued)

FOREIGN PATENT DOCUMENTS

WO      2007040323      *   4/2007   ............... H04B 7/00

OTHER PUBLICATIONS

3rd Generation Partnership Project, Universal Mobile Telecommunications System (UMTS); Evolved Universal Terrestrial Radio Access (E-UTRA) and Evolved Universal Terrestrial Radio Access (E-UTRAN), 3GPP TS 36.300 Version 8.0.0 Release 8, Mar. 2007, p. 1-82.

(Continued)

*Primary Examiner* — Barry Taylor
(74) *Attorney, Agent, or Firm* — Squire Sanders (US) LLP

(57) ABSTRACT

An apparatus, method and system for scheduling uplink resources in communication systems. In one embodiment, the apparatus (e.g., user equipment) 300 includes a buffer 340 containing data to be transmitted to an entity (e.g., a base station) 400 of the communication system. The apparatus 300 also includes a processing unit 310 configured to provide a request for the entity 400 for an uplink resource allocation for transmission of the data in the buffer 340 when the data is a first type. The processing unit 310 is also configured to provide a request following a delay period for the entity 400 for an uplink resource allocation for transmission of the data in the buffer 340 when the data is a second type.

20 Claims, 6 Drawing Sheets

(56) References Cited

U.S. PATENT DOCUMENTS

| | | | |
|---|---|---|---|
| 2005/0089064 A1* | 4/2005 | Zimmerman et al. | 370/468 |
| 2005/0105553 A1* | 5/2005 | Zhang et al. | 370/468 |
| 2008/0043771 A1* | 2/2008 | Cho et al. | 370/431 |
| 2008/0186892 A1* | 8/2008 | Damnjanovic | 370/311 |
| 2008/0253323 A1* | 10/2008 | Fischer | 370/329 |
| 2010/0069064 A1* | 3/2010 | Hannu et al. | 455/434 |
| 2010/0255835 A1* | 10/2010 | Suzuki et al. | 455/425 |

OTHER PUBLICATIONS

International Search Report and Written Opinion Relating to PCT Application No. PCT/IB2008/051617 sent on Dec. 24, 2008, p. 1-4.

* cited by examiner

SYSTEM AND METHOD FOR REQUESTING UPLINK RESOURCES IN A COMMUNICATION SYSTEM

RELATED APPLICATION

This application was originally filed as PCT Application No. PCT/IB2008/051617 on Apr. 25, 2008 and claims priority to U.S. Provisional Application No. 60/926,686 filed on Apr. 26, 2007, which is incorporated herein by reference in its entirety.

This application claims the benefit of U.S. Provisional Application No. 60/926,686 entitled "Method for Requesting Uplink Resources in an E-UTRAN Active Mode," filed on Apr. 26, 2007, which is incorporated herein by reference.

TECHNICAL FIELD

The present invention is directed, in general, to data transmission in communication systems, and in particular to scheduling uplink resources in communication systems such as universal terrestrial radio access network ("UTRAN") and evolved universal terrestrial radio access network ("E-UTRAN").

BACKGROUND

Long term evolution ("LTE"), also referred to as 3.9G, refers to research and development involving the third generation partnership project ("3GPP"), which is the name generally used to describe an ongoing effort across the industry aimed at identifying technologies and capabilities that can improve systems such as the universal mobile communication system ("UMTS"). The goals of this broadly based project include improving communication efficiency, lowering costs, improving services, making use of new spectrum opportunities, and achieving better integration with other open standards. The 3GPP LTE project is not itself a standard-generating effort, but will result in new recommendations for standards for the UMTS.

The evolved universal terrestrial radio access network ("E-UTRAN") in 3GPP includes base stations, providing user plane (including packet data convergence protocol/radio link control/medium access control/physical sublayers) and control plane (including a radio resource control sublayer) protocol terminations towards mobile terminal devices. A mobile terminal device such as a wireless mobile terminal device is generally known as a user equipment ("UE"). A base station is an entity of a communication network often referred to as a Node B or an NB. Particularly in the E-UTRAN, a base station is referred to as an eNB. The base stations are interconnected with each other by X2 interfaces. The base stations are also connected by S1 interfaces to an evolved packet core. For details about the overall architecture of the E-UTRAN, see 3GPP TS 36.300, v1.0.0 (2007-03), which is incorporated herein by reference.

As communication systems such as cellular telephone, satellite, and microwave communication systems become widely deployed and continue to attract a growing number of users, there is a pressing need to accommodate a large and variable number of communication devices transmitting a growing volume of data with fixed resources. Traditional communication system designs employing a fixed resource (e.g., a fixed data rate for each communication device) have become challenged to provide high, but flexible, data transmission rates in view of the rapidly growing customer base and expanding levels of service.

To dynamically allocate uplink ("UL") and downlink ("DL") data packet transmission resources among all the user equipment connecting to the base station, a base station includes one or more packet schedulers controlled by the radio resource control ("RRC") sublayer. The packet scheduler takes into account the traffic volume and the quality of service ("QoS") requirements of each user equipment and associated radio bearers, assigns resources among user equipments, and possibly also between different radio bearers associated with a single user equipment.

For uplink transmission, in principle, the user equipments are only allowed to transmit data at their allocated time intervals. If there is data to be transmitted, a user equipment temporarily stores the data in a buffer and transmits the data using available uplink resource allocations. In order to obtain the uplink resource allocations, the user equipment needs to indicate a request to the base station by providing measurement reports. The measurement reports may include buffer status reports and measurements of the radio environment of the user equipment. The packet scheduler of the base station schedules uplink resource allocations according to the measurement reports.

The user equipments in the UMTS, for instance, are operated in various RRC modes such as connected, idle, etc. In the LTE, these RRC modes are simplified into three modes, namely, LTE_Active, LTE_Idle and LTE_Detached. In the active mode (e.g., LTE_Active), the user equipment has an active connection to the base station for transmitting and receiving signals. If the buffer of the user equipment is empty and there is no incoming data to be transmitted, the user equipment enters a discontinuous reception ("DRX") state. The discontinuous reception state is characterized by a discontinuous reception period (using a discontinuous reception timer), which may be variable in length. The length of the discontinuous reception period may depend on the connection requirements of the current connection(s), and may vary between zero seconds (no discontinuous reception applied, also referred to as non-discontinuous reception mode) to a relatively long period (e.g., up to 5.12 seconds). In the discontinuous reception period, the user equipment listens on one or more of a physical downlink control channel ("PDCCH") at each discontinuous reception timeout to see if any allocations are reserved therefor. The purpose for using the discontinuous reception is to prolong battery life of the user equipment.

The user equipments may request uplink resource allocations for future use. Scheduling requests for future allocations are sent in the same way as uplink data transmissions (e.g., via shared transport channels or via dedicated control signaling in the uplink). Since the allocation of resources is based on buffer status reports, if a user equipment's buffer is empty, the base station packet scheduler may not schedule any resource to the user equipment, even for transmitting a request. Therefore, the user equipment may have to send the request by using a different channel, for example, by using a random access channel ("RACH") or a packet uplink control channel ("PUCCH"). The RACH procedure is a standard procedure for requesting uplink resources in other communication systems as well as in the LTE or an RRC idle and/or detached mode. The RACH procedure may also be used in LTE_Active (RRC_connected) mode for requesting resources in the uplink. Sending scheduling requests on the PUCCH is applicable to user equipment in an RRC_connected mode and with valid uplink timing advance.

A problem may occur when the user equipment receives new uplink data for transmission after being without any uplink resource allocation for a period of time. The user equipment does not know if and when the communication system may allocate uplink resources to the user equipment. If the user equipment waits until the next uplink resource allocation to transmit the data, it might have to wait for a long time, which may not be acceptable for the user of the user equipment or the communication system. For example, if the user equipment has to transfer data on a radio bearer that has strict timing requirements, under the current scheme, the transmission might not be initiated quickly enough. On the other hand, if the user equipment already has allocations scheduled for future use (e.g., if persistent uplink/downlink resource allocations already exist), initiating a RACH procedure for requesting uplink resources would be unnecessary and wasteful, since it consumes communication system resources.

Another problem of the RACH procedure is related to the RACH reply from the base station to the user equipment. It may be possible that even though the user equipment requests resource allocations using the RACH, the network cannot or will not assign resources to the user equipment. This leaves the RACH request "unanswered." The communication system not answering or replying the RACH request might have negative side effects on the user equipment. On the other hand, the base station may wish to schedule the user equipment, but the scheduling will be assigned at a next timed resource allocation at the end of a discontinuous reception period. If so, the user equipment needs to be informed.

Therefore, what is needed in the art is a system and method that allows for more flexible or efficient scheduling of uplink resources, especially, when the user equipment enters or is in the active mode. Accordingly, what is also needed is a user equipment equipped for performing a procedure for flexible or efficient scheduling of uplink resources, and a communication system entity such as a base station that facilitates the execution of the procedure and assigns the uplink transmission resources according thereto.

SUMMARY OF THE INVENTION

These and other problems are generally solved or circumvented, and technical advantages are generally achieved, by embodiments of the present invention, which include an apparatus, method and system for scheduling uplink resources in communication systems. In one embodiment, the apparatus (e.g., user equipment) includes a buffer containing data to be transmitted to an entity (e.g., a base station) of the communication system. The apparatus also includes a processing unit configured to provide a request for the entity on a random access channel for an uplink resource allocation for transmission of the data in the buffer when the data is a first type. The processing unit is also configured to provide a request following a delay period for the entity on a random access channel for an uplink resource allocation for transmission of the data in the buffer when the data is a second type.

In another aspect of the present invention, the apparatus (e.g., a base station) includes a receiver configured to receive a request for an uplink resource allocation on a random access channel from user equipment of the communication system. The apparatus also includes a scheduler configured to allocate an uplink resource allocation for transmission of data from the user equipment when the data is a first type. The scheduler is also configured to acknowledge the request and allocate an uplink resource allocation following a delay period for transmission of data from the user equipment when the data is a second type.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In view of the foregoing, the present invention will be described with respect to exemplary embodiments in a specific context of a system and method for determining whether a user equipment should use a RACH procedure to request uplink resources in the LTE_Active mode (or the like). An embodiment of the present invention also provides a system and method for a base station to determine if a RACH request for uplink resources from the user equipment should be answered with a grant of resource allocation or should be put "on hold." In this section, conditions are described for a user equipment to use a RACH or similar means (herein, a RACH procedure) for uplink resource requests.

Figure 1:
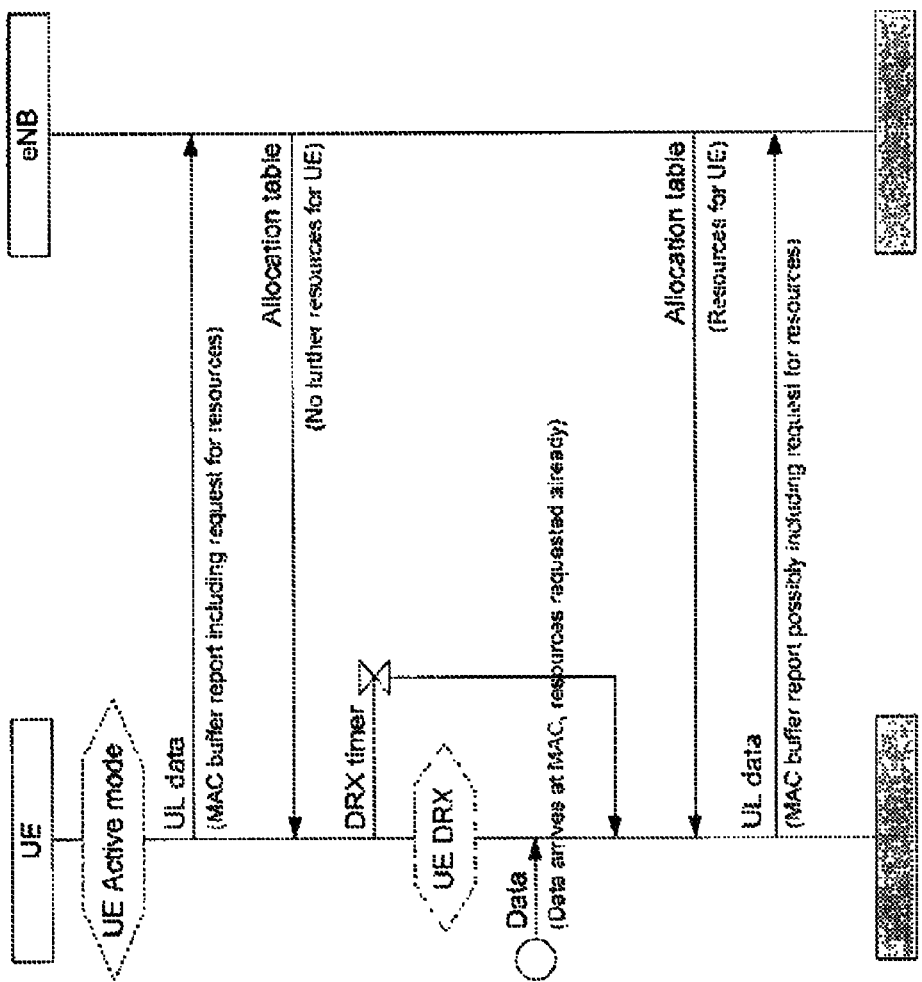
FIG. 1 illustrates a flow diagram showing a user equipment requesting uplink resource allocations for user data transmission according to the principles of the present invention.

Referring now to FIG. 1, illustrated is a flow diagram showing a user equipment requesting uplink resource allocations for user data transmission according to the principles of the present invention. As illustrated in FIG. 1, the user equipment is in an active (connected) mode, such as the LTE_Active mode, for transmitting data using allocated uplink resources. During the uplink transmission, the user equipment may use the allocated resources to send buffer status reports and request resources for transmitting data in the buffer. The base station, in response, may send allocation information such as allocation tables to the user equipment for allowing data to be transmitted.

The base station scheduler is operated in such a way that, when all the data in the buffer of the user equipment has been transmitted, there will be no further resource allocation for the user equipment. The user equipment then (possibly after a pre-determined delay time) enters a discontinuous reception period (marked by a DRX timer). In the discontinuous reception period, the user equipment does not transmit any data, and therefore no uplink resources are allocated to the user equipment. However, it is possible that a persistent allocation is assigned to the user equipment at the end of the discontinuous reception period.

Suppose that, during the discontinuous reception period, data arrived in the user equipment's buffer. The user equipment, knowing that there is currently no uplink resource allocation, determines whether to make a resource allocation request immediately or after a relatively short time (immediately thereafter), or wait until the end of the discontinuous reception period to make the request. A decision to immediately initiate requesting a resource allocation causes the user equipment to end the discontinuous reception period and to initialize a RACH procedure.

The decision when to make an uplink resource allocation may be made depending on the type and priority of the data to be transmitted. The data to be transmitted may be a normal priority type, such as user data (a "first type" of data) or a high-priority type that has a strict timing requirement, such as radio resource signals (a "second type" of data). For a normal priority data transmission, the decision is based on whether a persistent allocation is assigned to the user equipment at the end of the discontinuous reception period. As shown in FIG. 1, if the user equipment has persistent uplink resource allocations already scheduled, the user equipment does not use a RACH procedure for further resource requests. It waits for the persistent uplink resource allocation at the end of the discontinuous reception cycle (referred to as "hold-and-wait"). This persistent allocation may be used for transmitting the newly arrived data and/or a further resource request. If the time interval between the uplink allocations is relatively short (if the discontinuous reception cycle is also short), the "hold and wait" would not significantly affect the performance of the user equipment.

Alternatively, if there is no persistent uplink allocation, if the discontinuous reception cycle is relatively long, or if the current uplink allocation is not sufficient for transmitting all of the data in the buffer, the user equipment may initiate a resource request procedure using the RACH. The RACH procedure may be initiated immediately, after a discontinuous reception cycle, or after a predefined delay period. The predefined delay period is referred to as a Tolerable Delay (T_delay). For example, the T_delay may be defined as a system parameter (as signaled, e.g., in system information). The user equipment is configured to compare the time interval (T) between the arrival of the data and the scheduled next allocation (if any) with the T_delay. If the wait time for the next persistent uplink allocation is shorter than the tolerable delay (T<T_delay), there is no need to initiate the RACH procedure and the user equipment waits for the resource allocation. If T>T_delay, the user equipment initiates the RACH procedure immediately or after waiting for a time period that equals the T_delay. Another possibility for the user equipment to request uplink resources is to send a resource request in the next uplink allocation (not limited to persistent uplink allocations) if the user equipment has reported earlier to the network that it has unsent data in the buffers. Reporting of unsent data may be achieved using means such as buffer status reports.

Figure 2:
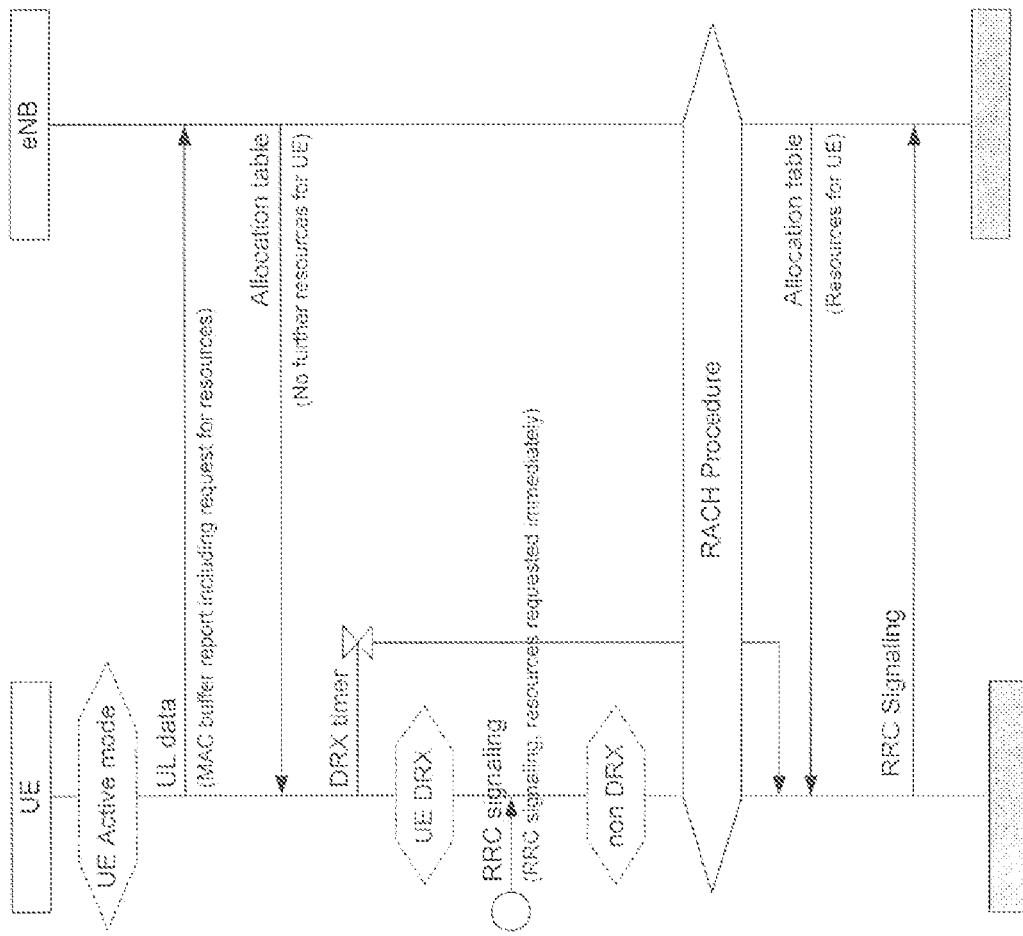
FIG. 2 illustrates a flow diagram illustrating the user equipment requesting uplink resource allocations for RRC signaling according to the principles of the present invention.

Turning now to FIG. 2, illustrated is a flow diagram illustrating the user equipment requesting uplink resource allocations for RRC signaling according to the principles of the present invention. The priority of data affects whether or not the user equipment uses the above "hold and wait" procedure. As an example, for high priority data using RRC or media access control ("MAC") signaling, etc., the user equipment is configured to initiate RACH procedure immediately. As shown in FIG. 2, if there is data in the user equipment's buffer for RRC or MAC signaling, the user equipment is configured to exit the discontinuous reception cycle. The user equipment may start the RACH procedure, even if the discontinuous reception cycle has not expired. Once the base station responds with an allocation, the user equipment sends the high priority data using the allocation. Some radio bearers can be configured always to use a RACH to request uplink resources in the active mode. The user equipment may have different tolerable delays for different radio bearers (e.g., a shorter delay for signaling radio bearers and a longer delay for user data radio bearers).

Therefore, according to an embodiment, the user equipment does not always use a RACH procedure for requesting an uplink resource allocation. A radio resource request using the RACH procedure (or any other method, e.g., using a dedicated resource request channel) can be avoided if the user equipment already has some kind of uplink persistent allocation. The strategy can be different depending on the particular radio bearer. A radio resource request is not needed if the user equipment has requested a uplink allocation earlier (for data with the same or higher priority), because the communication system should be allocating resources for the user equipment. In those allocated resources, the user equipment could indicate that it has received more data in its buffers.

The RACH procedures are used when there is high priority data in the buffer or if the discontinuous reception cycle is longer than the predefined tolerable delay. Tolerable delay may be defined, e.g., by system information, and can vary according to the priority of the data. For signaling, the tolerable delay may be very short (or non-existent), but for some user data it may be relatively long e.g., several hundreds of milliseconds.

Figure 3:
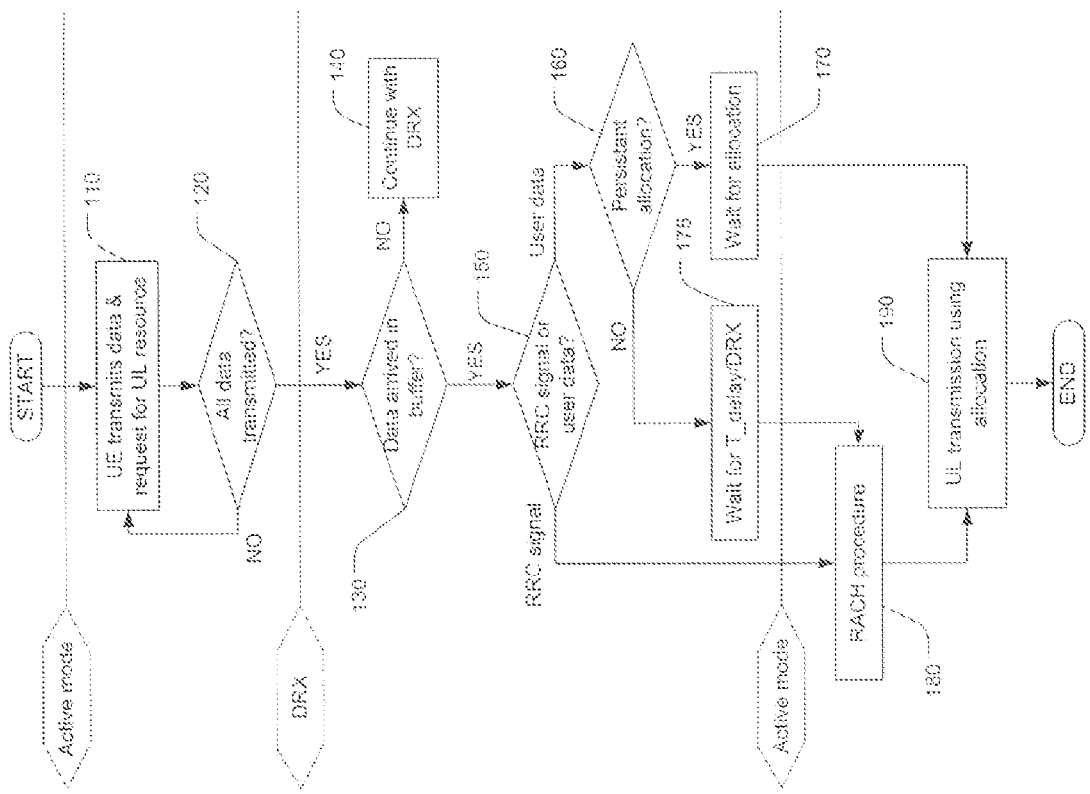
FIG. 3 illustrates a flow diagram of a method for the user equipment to request uplink resource allocations according to the principles of the present invention.

Turning now to FIG. 3, illustrated is a flow diagram of the method for the user equipment to request uplink resource allocations according to the principles of the present invention. Summarizing the above, an apparatus, system, and method for a mobile terminal device to request an uplink transmission resource through RACH according to the conditions set above is illustrated in FIG. 3. When a user equipment is in an active mode (including reception ("RX") and transmission ("TX")), it receives resource allocations on the PDCCH and may transmit and receive data to or from, and request uplink resources from, the base station at a step 110. The user equipment checks its buffer to determine if all data in the buffer has been transmitted at a step 120. If not, the user equipment continues sending data and requesting resource allocations (if resource allocations are given). If all the data has been sent, and this is possibly indicated to the base station, no further resource allocations are given to the user equipment. After a possible predefined delay time, the user equipment enters a discontinuous reception state characterized by one or more discontinuous reception cycles. In the discontinuous reception cycle, the user equipment is aware if there is new data arriving in the buffer at a step 130. If no data needs to be transmitted, the user equipment continues with the discontinuous reception cycle at a step 140. Otherwise, the user equipment checks to determine if the data to be transmitted is of normal priority (such as user data) or of high priority (such as MAC or RRC signaling) at a step 150.

If the data in the buffer is user data (normal priority), the user equipment determines if there is a persistent allocation, i.e., a previously requested and assigned resource allocation to be used after the end of the discontinuous reception cycle at a step 160. If there is a persistent allocation, the user equipment waits for the allocation at a step 170 and uses it for transmitting the user data at a step 190 and/or requesting further resources from the base station. Otherwise, if there in no persistent allocation, the user equipment waits for a time period equivalent to a predefined tolerable delay (T_delay) or the end of the discontinuous reception cycle, whichever is shorter at a step 175. If, at the end of the waiting period, there is still no allocation, the user equipment enters the active mode again and starts a RACH procedure for requesting resources at a step 180. The user equipment transmits the user data using the assigned resources at the step 190.

If, at the step 150, the data in the buffer is of high priority, such as that for MAC/RRC signaling, the user equipment either immediately exits the discontinuous reception cycle or waits for a tolerable delay and then exits the discontinuous reception cycle. This tolerable delay may be the same or different from the T_delay for the user data. The user equipment starts a RACH procedure to request a resource at the step 180. The user equipment then transmits the high priority data using the assigned resource at the step 190.

In carrying out the system and method, an E-UTRAN user equipment keeps track of expected uplink resources. Before any uplink resource request, the user equipment checks whether RACH is to be used by the above rules, or if the user equipment should wait until the next timed uplink scheduling for a resource request. This can be done by tracking the buffer occupancy measurements done by the user equipment (i.e., the user equipment includes a module for tracking expected uplink resources by measuring buffer occupancy). The network signals the user equipment the maximum time limit for the delay in a resource request. The time limit may differ per radio bearer. Basically, this encompasses the maximum time between timed resource allocations for a persistent allocation.

Figure 4:
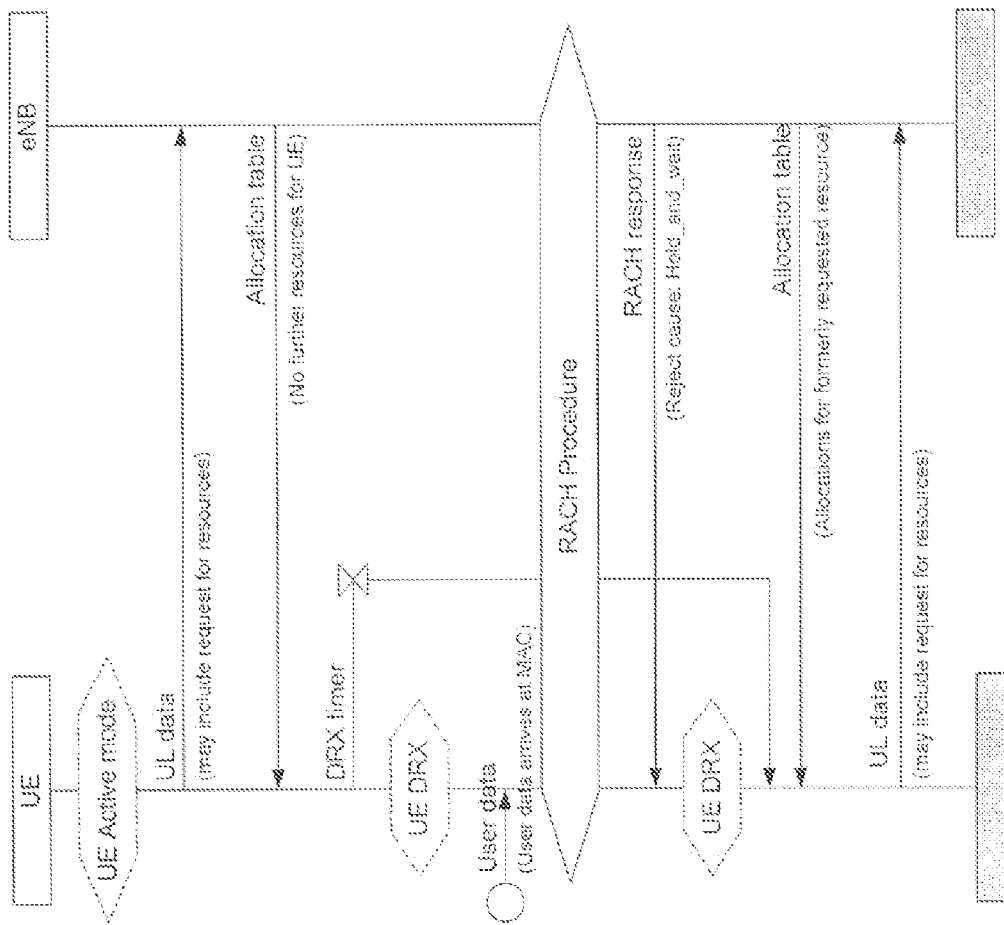
FIG. 4 illustrates a flow diagram illustrating a base station scheduling uplink resources according to the principles of the present invention.

Turning now to FIG. 4, illustrated is a flow diagram illustrating a base station scheduling uplink resources according to the principles of the present invention. In this section, conditions are described for a network entity, e.g., a base station, to respond to a RACH request from a user equipment for uplink resources. The user equipment in the active mode uses the allocated resources to send buffer status reports and to request resources if the buffer is not empty. The base station sends allocation tables to the user equipment for allowing data to be transmitted.

When all of the data in the buffer of the user equipment has been transmitted, there will be no further allocation for the user equipment. The user equipment then enters the discontinuous reception mode (marked by a discontinuous reception timer). In a discontinuous reception period, the user equipment does not transmit any data and, therefore, no uplink resources are allocated to the user equipment. However, the base station may have allocated further resources to the user equipment at the end of the discontinuous reception cycle in response to an earlier resource request.

If there is a RACH resource request from the user equipment, the base station uplink scheduler or scheduler may respond by granting an allocation immediately or by setting the user equipment "on hold (i.e., by temporarily not granting any allocation, but acknowledging the reception of the resource request). Setting the user equipment "on hold" is indicated to the user equipment by a RACH Reject response message indicating that the network has received the request, but the user equipment will be scheduled on a next scheduling period (e.g., the Reject response message may include a reject cause of "hold_and_wait"). This next scheduling period is determined by the discontinuous reception scheme. The scheduler is configured to send this message if, for instance, the next uplink resource allocation is going to occur in a time period that is sufficiently short (e.g., T<T_delay), or there is an allocation already scheduled. Based on this "on hold" response, the user equipment waits for the end of the discontinuous reception period to get the uplink resource allocation.

The scheduler is further configured to determine the priority of the RACH request by using indications such as radio bearer. Some radio bearers can be configured to always use a RACH to request uplink resources in the active mode, and the scheduler treats the request as being of high priority. For example, a radio bearer carrying RRC signaling can be configured always to use a RACH, and the base station can be configured always to respond to this type of RACH request with an allocation, never using the "on hold" response.

By sending the "on hold" message, the user equipment is informed that RACH procedure has succeeded and it will then end the RACH procedure. When the network has indicated the "on hold" status after receiving RACH from user equipment, the user equipment does not stay in the continuous reception state (non-discontinuous reception, the user equipment entered this state for sending the RACH message) but returns to discontinuous reception ("DRX") and waits for the next discontinuous reception period (or, as stated, waits for the scheduling point that was signaled by the communication system). This helps the scheduler to distribute simultaneous user equipment RACH requests to longer times without additional capacity needed for RACH procedures, because a user equipment does not reinitiate the RACH procedure.

Figure 5:
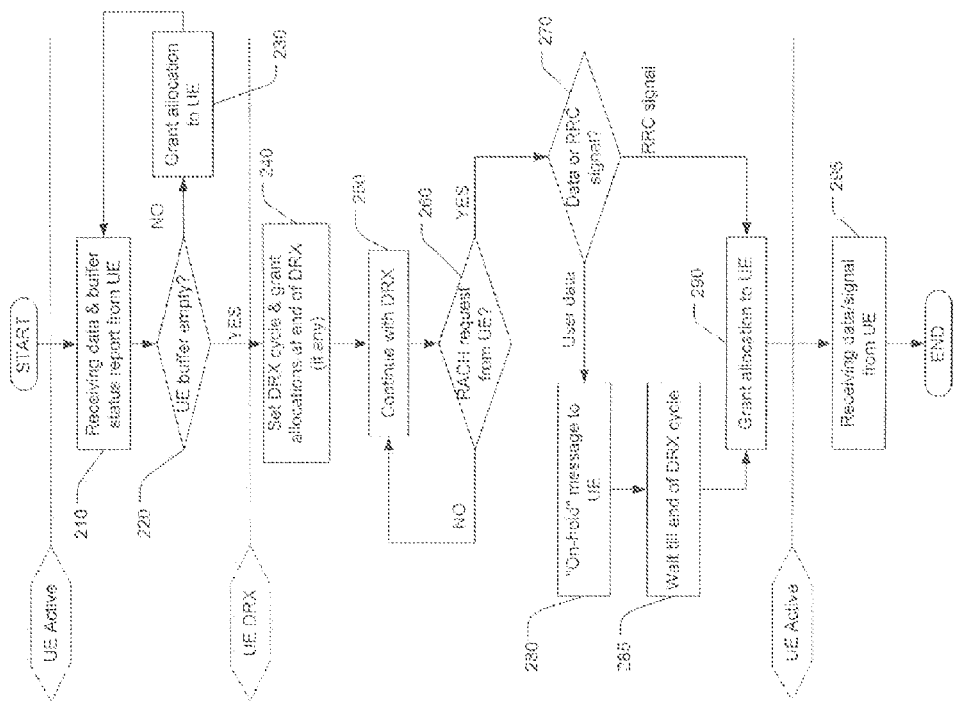
FIG. 5 illustrates a flow diagram of a method for the base station to schedule uplink resources according to the principles of the present invention.

Turning now to FIG. 5, illustrated is a flow diagram of the method for the base station to schedule uplink resources according to the principles of the present invention. Summarizing the above, the system and method according to this embodiment are illustrated in FIG. 5. When a user equipment is in an active mode, the base station receives data and buffer status reports from the user equipment at a step 210. The base station checks to see if the buffer is empty (i.e., all data in the buffer is transmitted) at a step 220. If the buffer is not empty, the base station continues granting resource allocations to the user equipment at a step 230. If the base station determines that the buffer is empty, it allows the user equipment to enter a discontinuous reception cycle and prepares to grant resource allocations to the user equipment at the end of the discontinuous reception cycle at a step 240. The need of the allocation may be determined based on previous buffer status reports. The user equipment continues with the discontinuous reception cycle if there is no uplink data, and the base station monitors the user equipment at a step 250.

If, during the discontinuous reception state, the base station receives a resource request from the user equipment over the RACH at a step 260, probably because the user equipment just received data to be transmitted, the base station determines if the data to be transmitted is of normal priority (such as user data), or of high priority (such as MAC or RRC signaling) at a step 270. The determination of the priority may be based on radio bearer or channel information. If the data in the buffer is user data (normal priority), the base station determines if there is allocation of a resource to be scheduled after the end of the discontinuous reception cycle. If there is an allocation, the base station sends a RACH response (a hold_and_waits response) at a step 280. The base station waits for the end of the discontinuous reception cycle at a step 285 and grants allocation to user equipment at a step 290. The base station then receives the normal priority data from the user equipment at a step 295. Otherwise, if the data is of high priority, the base station grants an allocation to user equipment at the step 290. The base station then receives the high priority data from the user equipment at the step 295. Advantages of an embodiment include less usage of the RACH resource, and more freedom for the packet schedulers for the base stations.

Figure 6:
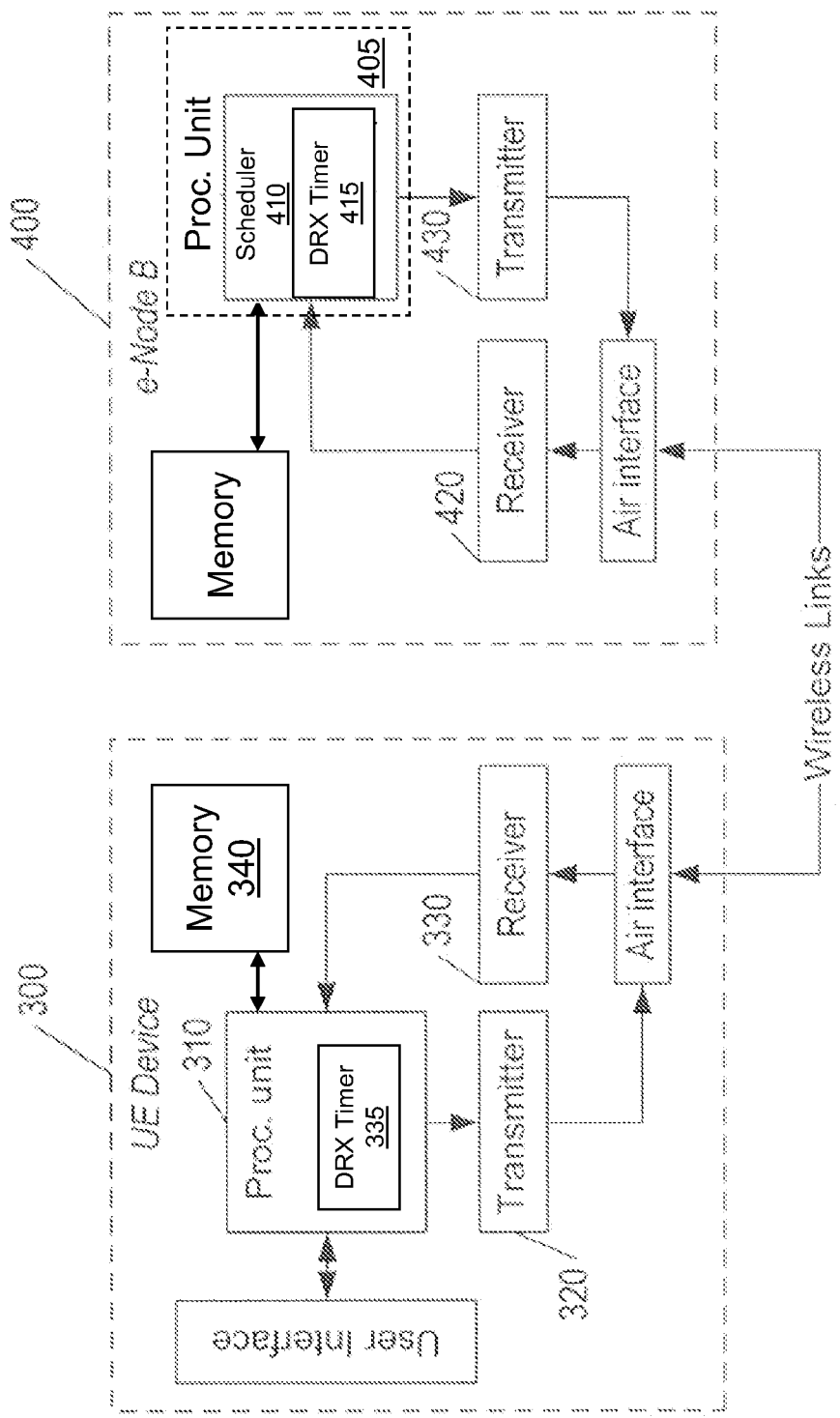
FIG. 6 illustrates a block diagram of a communication system constructed according to the principles of the present invention.

Turning now to FIG. 6, illustrated is a block diagram of a communication system constructed according to the principles of the present invention. A mobile terminal device or user equipment ("UE") is connected over a wireless communication link to a base station ("e-Node B" or eNB"). The user equipment 300 includes a processing unit 310, a transmitter 320, a receiver 330 and a memory or buffer 340. The processing unit 310 includes circuits that may be built as integrated circuits on chips, configured to determine whether to request a resource allocation for transmitting data to the base station 400 by RACH procedure based on whether the user equipment has a persistent resource allocation. The transmitter 320 is configured to transmit the RACH message to the base station 400 for requesting the resource allocation. The receiver 330 in accordance with timing information provided by a DRX timer 335 is configured to receive data including uplink resource allocation from the base station 400. Determining whether to request resource allocations by RACH may be based on one or more conditions related to the type of data to be transmitted to the base station 400 on a shared transport channel.

The base station 400 includes a receiver 420 for receiving from the user equipment 300 a RACH message for an uplink resource request. The base station also includes a processing unit 405 with a scheduler 410 and a DRX timer 415. The scheduler 410 schedules an uplink resource allocation for the user equipment in accordance with the uplink resource request. Also, a transmitter 430 of the base station transmits information related to resource allocation to the user equipment 300. The scheduler 410 of the processing unit 405 includes circuits that may be built as integrated circuits on chips, configured to determine whether the request for resource allocation is for transmitting control signals or user data, for granting a resource allocation to the user equipment 300 immediately after receiving the request if the received data is for control signaling, or for providing an "on hold" message acknowledging the request, and granting a resource allocation to the user equipment 300 after the end of a discontinuous reception period if the received data is user data.

Further, a computer program product stored in a computer readable storage medium for use in a user equipment is provided therefor to request an uplink transmission resource through a random access channel. The computer program product includes instructions for determining whether a request for resource allocation should be submitted for transmitting data in a buffer of the user equipment, and instructions for determining if the request should be submitted immediately or after a period of time. The request should be submitted immediately if the data in the buffer is of high priority, and the request should be submitted after a period of time if the data in the buffer is of normal priority and an upcoming allocation of the resource has not been scheduled by a scheduler of the base station. The computer program product may be installed and run in a user equipment operable according to the E-UTRAN standards.

Still further, another computer program product stored in a computer readable storage medium is provided for use in an entity of a communication system to respond a request for uplink resource allocation through a random access channel from a user equipment connected to the entity. The entity includes a scheduler for scheduling uplink transmission resource allocations for one or more user equipment connected to the entity. The computer program product includes instructions for determining whether the request for resource allocation is for transmitting data of high priority or of normal priority, instructions for granting a resource allocation to the user equipment immediately after receiving the request if the data is of high priority, or providing a message acknowledging the request and granting a resource allocation to the user equipment after a period of time if the data is of normal priority. The computer program product may be installed and run in a base station operable according to the E-UTRAN standards. Although the invention has been illustrated in connection with LTE and E-UTRAN communication systems, it is understood that the invention is also applicable to other modes of operations or to other communication platforms.

Thus, a system and method have been introduced for scheduling uplink resources in communication systems. In one embodiment, a method is provided for user equipment to request an uplink transmission resource through a random access channel. The user equipment is connected to an entity of a communication system. The method includes determining whether a request for resource allocation should be submitted for transmitting data in a buffer of the user equipment, and if the request should be submitted, determining if the request should be submitted immediately or after a period of time. The request should be submitted immediately if the data in the buffer is of a first type. The request should be submitted after a period of time if the data in the buffer is of a second type and an upcoming allocation of the resource has not been scheduled by a scheduler of the entity. The first type of data may include control signaling data to be transmitted according to a timing requirement of the communication system. The second type of data may include any other data except the first type of data. In the above method, the user equipment may be in a discontinuous reception mode characterized by a discontinuous reception cycle when the data to be transmitted arrives at the buffer of the user equipment, and the request to be submitted for the second type of data after a period of time may be submitted at the end of the discontinuous reception cycle or a predefined time period, whichever is shorter.

In another aspect of the present invention, a method is provided for an entity of a communication system to respond a request for uplink resource allocation through a random access channel from a user equipment connected to the entity. The entity includes a scheduler for scheduling uplink transmission resource allocations for one or more user equipment connected to the entity. The method includes determining whether the request for resource allocation is for transmitting data of a first type or a second type, granting a resource allocation to the user equipment immediately after receiving the request if the data is of the first type, or providing a message acknowledging the request and granting a resource allocation to the user equipment after a period of time if the data is of the second type. The first type of data may include control signaling data to be transmitted according to a timing requirement of the communication system. The second type of data may include any other data except the first type of data. In the above method, the user equipment may be in a discontinuous reception mode characterized by a discontinuous reception cycle when the data to be transmitted arrives at the buffer of the user equipment, and the resource allocation may be granted for the second type of data at the end of the discontinuous reception cycle or a predefined time period, whichever is shorter.

In another aspect of the present invention, a user equipment is provided for requesting an uplink transmission resource allocation through a random access channel. The user equipment is connected to an entity of a communication system. The user equipment includes a processing unit configured to determine whether a request for resource allocation should be submitted to the scheduler for transmitting data in a buffer of the user equipment and, if the request should be submitted, determine if the request should be submitted immediately or after a period of time. The request should be submitted immediately if the data in the buffer is of a first type, and the request should be submitted after a period of time if the data in the buffer is of a second type and an upcoming allocation of the resource has not been scheduled by a scheduler of the entity. The first type of data may include control signaling data to be transmitted according to a timing requirement of the communication system and the second type of data may include any other data except the first type of data. The user equipment may be in a discontinuous reception mode characterized by a discontinuous reception cycle when the data to be transmitted arrives at the buffer of the user equipment, and the request to be submitted for the second type of data after a period of time may be submitted at the end of the discontinuous reception cycle or a predefined time period, whichever is shorter. The user equipment may be a wireless communication device operable according to evolved universal terrestrial radio access network ("E-UTRAN") standards and the processing unit may include one or more chips comprising integrated circuits.

In another aspect of the present invention, an entity of a communication system is provided for responding to a request for uplink resource allocation through a random access channel from a user equipment connected to the entity. The entity includes a scheduler for scheduling uplink transmission resource allocations for one or more user equipment connected to the entity. The scheduler is configured to determine whether the request for resource allocation is for transmitting data of a first type or a second type, grant a resource allocation to the user equipment immediately after receiving the request if the data is of the first type, or provide a message acknowledging the request and grant a resource allocation to the user equipment after a period of time if the data is of the second type. The first type of data may include control signaling data to be transmitted according to a timing requirement of the communication system and the second type of data may include any other data except the first type of data. The user equipment may be in a discontinuous reception mode characterized by a discontinuous reception cycle when the data to be transmitted arrives at the buffer of the device, and the resource allocation may be granted for the second type of data at the end of the discontinuous reception cycle or a predefined time period, whichever is shorter. The entity may be a base station operable according to evolved universal terrestrial radio access network ("E-UTRAN") standards and the scheduler may include one or more chips comprising integrated circuits.

As described above, the exemplary embodiment provides both a method and corresponding apparatus including various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to request an uplink resource allocation, as described herein. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   a buffer containing data to be transmitted to an entity of a communication system; and
   a processing unit configured to:
      provide a request for said entity for an uplink resource allocation for transmission of said data in said buffer when said data is a first type, and
      provide a request following a delay period for said entity for an uplink resource allocation for transmission of said data in said buffer when said data is a second type, wherein the data of the second type has a higher priority than the data of the first type,
      wherein the first type of data comprises user data and the second type of data comprises radio resource signals.

2. The apparatus as recited in claim 1 further comprising a transmitter configured to transmit said request and said data in said buffer in accordance with said processing unit.

3. The apparatus as recited in claim 1 wherein said processing unit is configured to provide said request following said delay period when said data is said second type if a receiver of said apparatus has not received a scheduled allocation from said entity for said uplink resource allocation.

4. The apparatus as recited in claim 1 wherein said data of said first type includes control signaling to be transmitted according to a timing requirement of said communication system.

5. The apparatus as recited in claim 1 wherein said apparatus is in a discontinuous reception mode and said delay period represents a shorter period of a discontinuous reception cycle or a predefined delay period.

6. The apparatus as recited in claim 1 wherein said processing unit provides said requests on a random access channel.

7. The apparatus as recited in claim 1 wherein said apparatus is user equipment and said entity is a base station of said communication system.

8. The apparatus as recited in claim 1 wherein said processing unit is formed by an integrated circuit on a chip.

9. A method, comprising:
- storing data in a buffer to be transmitted to an entity of a communication system;
- providing a request for said entity for an uplink resource allocation for transmission of said data in said buffer when said data is a first type; and
- providing a request following a delay period for said entity for an uplink resource allocation for transmission of said data in said buffer when said data is a second type, wherein the data of the second type has a higher priority than the data of the first type,
- wherein the first type of data comprises user data and the second type of data comprises radio resource signals.

10. The method as recited in claim 9 further comprising transmitting said request and said data in said buffer in accordance with said providing.

11. The method as recited in claim 9 wherein said providing said request following said delay period when said data is said second type if a scheduled allocation from said entity for said uplink resource allocation has not been received.

12. The method as recited in claim 9 wherein said data of said first type includes control signaling to be transmitted according to a timing requirement of said communication system.

13. The method as recited in claim 9 wherein said method is performed by user equipment operating is in a discontinuous reception mode and said delay period represents a shorter period of a discontinuous reception cycle or a predefined delay period.

14. An apparatus, comprising:
- a receiver configured to receive a request for an uplink resource allocation from user equipment of a communication system; and
- a scheduler configured to:
  - allocate an uplink resource allocation for transmission of data from said user equipment when said data is a first type, and
  - acknowledge said request and allocate an uplink resource allocation following a predetermined delay period for transmission of data from said user equipment when said data is a second type, wherein the data of the second type has a higher priority than the data of the first type,
  - wherein the first type of data comprises user data and the second type of data comprises radio resource signals.

15. The apparatus as recited in claim 14 further comprising a transmitter configured to transmit said uplink resource allocation to said user equipment.

16. The apparatus as recited in claim 14 wherein said data of said first type includes control signaling to be transmitted according to a timing requirement of said communication system.

17. The apparatus as recited in claim 14 wherein said user equipment is in a discontinuous reception mode and said delay period represents a shorter period of a discontinuous reception cycle or a predefined delay period.

18. The apparatus as recited in claim 14 wherein said receiver is configured to receive said request for said uplink resource allocation from said user equipment over a random access channel.

19. The apparatus as recited in claim 14 wherein said apparatus is a base station of said communication system.

20. The apparatus as recited in claim 14 wherein said scheduler is formed by an integrated circuit on a chip.

* * * * *